United States Patent
Li et al.

(10) Patent No.: US 8,902,887 B2
(45) Date of Patent: Dec. 2, 2014

(54) LOAD-BALANCING STRUCTURE FOR PACKET SWITCHES AND ITS CONSTRUCTING METHOD

(75) Inventors: Hui Li, Guangdong (CN); Wei He, Guangdong (CN); Shuoyan Li, Guangdong (CN); Jiaqing Huang, Guangdong (CN); Jian Chen, Guangdong (CN); Kai Pan, Guangdong (CN); Shuxin Zhang, Guangdong (CN); Peng Yi, Guangdong (CN); Binqiang Wang, Guangdong (CN)

(73) Assignees: Peking University Shenzhen Graduate School, Shenzhen, Guangdong (CN); Shanghai Research Institute of Microelectronics (Shrime), Peking University, Shanghai (CN); Hu Li, Shenzhen, Guangdong (CN)

( * ) Notice: Subject to any disclaimer, the term of this patent is extended or adjusted under 35 U.S.C. 154(b) by 0 days.

(21) Appl. No.: 12/739,729

(22) PCT Filed: Oct. 31, 2009

(86) PCT No.: PCT/CN2009/074739
§ 371 (c)(1),
(2), (4) Date: Apr. 23, 2010

(87) PCT Pub. No.: WO2010/051737
PCT Pub. Date: May 14, 2010

(65) Prior Publication Data
US 2011/0176425 A1    Jul. 21, 2011

(30) Foreign Application Priority Data
Nov. 4, 2008 (CN) .......................... 2008 1 0217261

(51) Int. Cl.
H04L 12/28    (2006.01)
H04L 12/939   (2013.01)
H04L 12/933   (2013.01)

(52) U.S. Cl.
CPC ............ *H04L 49/101* (2013.01); *H04L 49/552* (2013.01)
USPC ....................................................... 370/389

(58) Field of Classification Search
USPC .................................................. 370/351–429
See application file for complete search history.

(56) References Cited

U.S. PATENT DOCUMENTS 4,993,018 A * 2/1991 Hajikano et al. ............... 370/392
5,157,654 A * 10/1992 Cisneros ....................... 370/414

(Continued)

*Primary Examiner* — Kwang B Yao
*Assistant Examiner* — Juvena Loo
(74) *Attorney, Agent, or Firm* — Jackson IPG PLLC

(57) ABSTRACT

This invention provides a load-balancing structure for packet switches and its constructing method. In this method, the structure based on self-routing concentrators is divided into two stages, that is, a first stage and a second stage fabric. A virtual output group queue (VOGQ) is appended to each input group port of the first stage fabric, and a reordering buffer (RB) is configured behind each output group port of the second stage fabric. Packets stored in the VOGQ are combined into data blocks with preset length, which is divided into data slices of fixed size, finally each data slice is added an address tag and is delivered to the first stage fabric for self-routing. Once reaching the RB, data slices are recombined into data blocks. This invention solves the packet out-of-sequence problem in the load-balancing Birkhoff-von Neumann switching structure and improves the end-to-end throughput.

7 Claims, 4 Drawing Sheets

(56) References Cited

U.S. PATENT DOCUMENTS

| | | | |
|---|---|---|---|
| 5,253,251 A * | 10/1993 | Aramaki | 370/394 |
| 5,341,369 A * | 8/1994 | Langer | 370/392 |
| 7,310,333 B1 * | 12/2007 | Conklin et al. | 370/388 |
| 2001/0023469 A1 * | 9/2001 | Jeong et al. | 710/241 |
| 2002/0024949 A1 * | 2/2002 | Tomonaga et al. | 370/389 |
| 2003/0112815 A1 * | 6/2003 | Lee | 370/412 |
| 2006/0165070 A1 * | 7/2006 | Hall et al. | 370/369 |
| 2006/0165098 A1 * | 7/2006 | Varma | 370/397 |

* cited by examiner

LOAD-BALANCING STRUCTURE FOR PACKET SWITCHES AND ITS CONSTRUCTING METHOD

FIELD OF THE INVENTION

This invention relates to communication technology and more particularly, to a structure of load-balancing packet switches and its constructing method.

BACKGROUND OF THE INVENTION

The so-called switching structure, in the application of telecommunications, is a kind of network equipment which achieves routing for data units and forwards them to the node of next hop.

When the distribution of arriving traffics to a switching system is unbalanced, some ports or internal line will become saturation while others are still in idle state because the internal capacity of any switching system is bounded. In order to avoid unbalanced traffic, load-balancing switching structure is used to solve this problem. The structure makes traffic uniformly distributed inside the switch, that is, the utilization of all ports and internal lines are identical. Such switching structure can improve throughput to the maximum extent and decrease the internal blocking.

The structure of load-balancing Birkhoff-von Neumann (LB-BvN) switches can solve the problem of internal blocking.

As shown in FIG. 1, the LB-BvN switch consists of two crossbar switch stages and one set of virtual output queue (VOQ) between these stages. The first stage performs load balancing and the second stage performs switching. This switch does not need any schedulers since the connection patterns of the two switch stages are deterministic and are repeated periodically. The connection patterns should be selected so that in every consecutive N time slot, each input should connect to each output exactly once with a duration of one time slot. It is clear this said load-balancing switching structure solves the problem of data blocking.

However, traffic is different and un-uniform for each input port, the number of packets belong to different flows is variable, so the size of mid-stage VOQ is also different. As queues are served uniformly independent of their sizes, this LB-BvN structure brings about queuing delay and packet out-of-sequence problem. Packet out-of-sequence makes TCP (Transmission Control Protocol) triggering a fast recovery processing, and its sliding window is reduced by half, thus the end-to-end throughput of this connection is reduced by half.

SUMMARY OF THE INVENTION

The present invention provides a structure of load-balancing packet switches and its constructing method which solves the packets out-of-sequence problem in LB-BvN switching structure, thus improve end-to-end throughput.

The method for constructing load-balancing packet switches includes:

The structure based on self-routing concentrators is divided into two-stage switching fabrics, that is, the first stage that is used to balance the load and the second stage that self-routes the reassembled data to their final destinations.

A Virtual Output Group Queue (VOGQ) is appended at each input group port of the first stage fabric and a Reordering Buffer (RB) is configured behind each output group port of the second stage fabric, the VOGQ is used to store data blocks that carries self-routing address information, the RB is used to reordering the data blocks according to their input group self-routing address for subsequent treatment.

Packets stored in the VOGQ are combined into a data block in preset length, which is divided into data slices of fixed size, then each data slice is added an address tag and delivered to the first stage fabric for self-routing. Then an address tag for self-routing is appended.

Once the data slices with self-routing tags has reached the reordering buffer (RB) of the output ports through the first stage and second stage fabric, they are recombined into data blocks according to self-routing tags carried by data slices.

The first stage fabric is connected to the second stage fabric by a set of middle line group.

The load-balancing structure based on self-routing concentrators adopts distributed self-routing mechanism.

Moreover, the invention provides a load-balancing packet switching structure including the first stage fabric based on self-routing concentrators that is used to balance the load and the second stage fabric that self-routes and forwards the reassembled data to their final destinations, wherein a VOGQ is appended at each input group port of the first stage fabric, and a RB is configured behind each output group port of the second stage fabric, wherein each of said VOGQ is used to store data blocks that carries self-routing address information, wherein each of said RB is used to reordering the data blocks according to their input group self-routing address for subsequent treatment, and the first stage fabric is connected to the second stage fabric by a set of middle line group.

The structure, which is based on self-routing concentrators, is divided into a first stage and a second stage fabric. A VOGQ is appended to each input group port of the first stage fabric, and a RB is configured behind each output group port of the second stage fabric. Packets stored in the VOGQ are combined into data blocks of preset length, which are divided into data slices of fixed size, then each data slice is added an address tag and is delivered to the first stage fabric for self-routing. Once reaching the RB, data slices are recombined into data blocks according the address tags appended on its head. Comparing this structure with the previous LB-BvN, it is clear that this invention of load-balancing packet switching structure abandons the VOQ between the first stage and the second stage fabrics, which avoids the problems of queue delay and packet out-of-sequence at the output port. Therefore, this invention solves the packet out-of-sequence problem in load-balancing Birkhoff-von Neumann switching structure and improves the end-to-end throughput.

BRIEF DESCRIPTION OF THE DRAWINGS

FIG. 2b is a specific diagram of the multi-path self-routing switching structure with parameters N=128, G=8, M=16 of FIG. 2a;

DETAILED DESCRIPTION OF THE INVENTION

Embodiments of the invention are best understood by referring to FIGS. 1 through 5 of the drawings.

The invention which is based on self-routing concentrators provides a packet switching structure, and the structure which mainly uses concentrators and line group technology can be constructed based on the routable multi-stage interconnect network (MIN).

Figure 1:
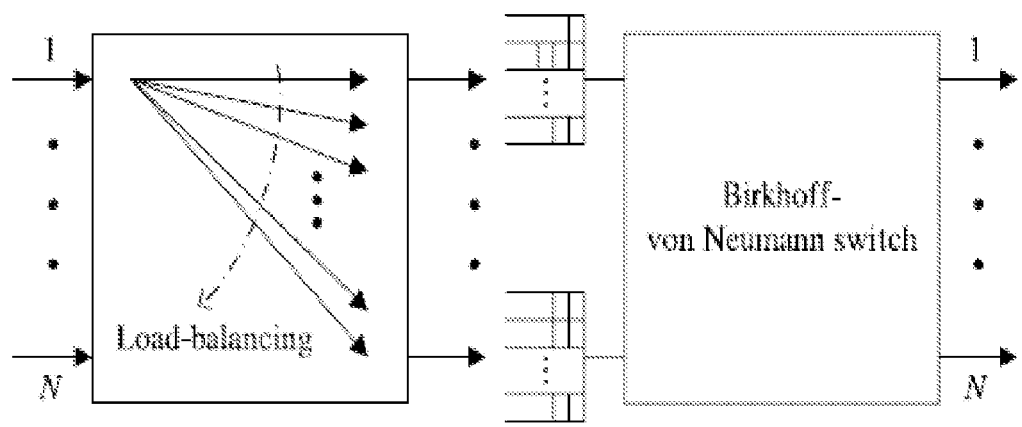
FIG. 1 illustrates the schematic of conventional load-balancing Birkhoff-von Neumann switching structure.
Figure 2A:
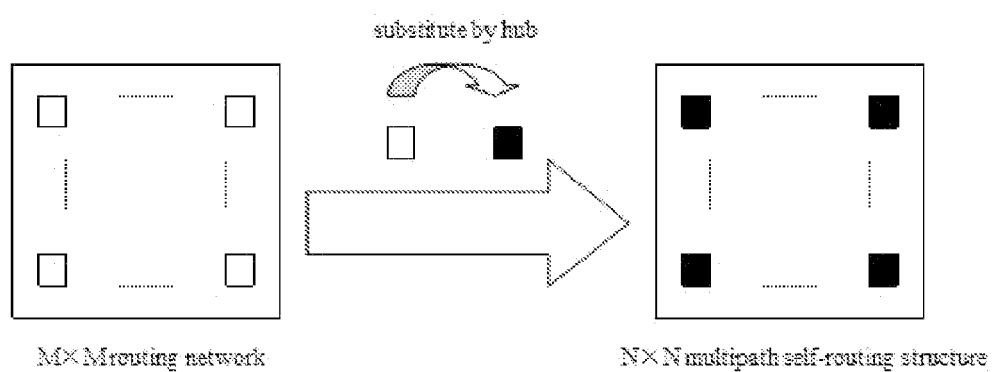
FIG. 2a depicts a general implementation example of the multi-path self-routing switching structure for each stage of this invention.

As illustrated in FIG. 2a, before constructing the self-routing concentrators based packet switching structure by an M×M routable MIN, usually, let $N=2^n$, $N=M \times G$, $M=2^m$, $G=2^g$. First, construct an M×M routable network (Divide-and-conquer networks are often chosen for their modularity, scalability and optimal layout complexity). Then, substitute each 2×2 routing cell with 2G-to-G self-routing group concentrators. Finally, substitute each line with G parallel lines. An N×N network with M output (input) groups and each group with G output (input) ports is built up. A 2G-to-G concentrator has two input and output groups, and the output group having smaller address is called 0-output group while the larger one is called 1-outptut group. For the same reason, two input groups are called 0-input group and 1-input group. For each signal, it is not differentiate to distinguish the output ports of the same group, as they are equivalent.

Figure 2B:
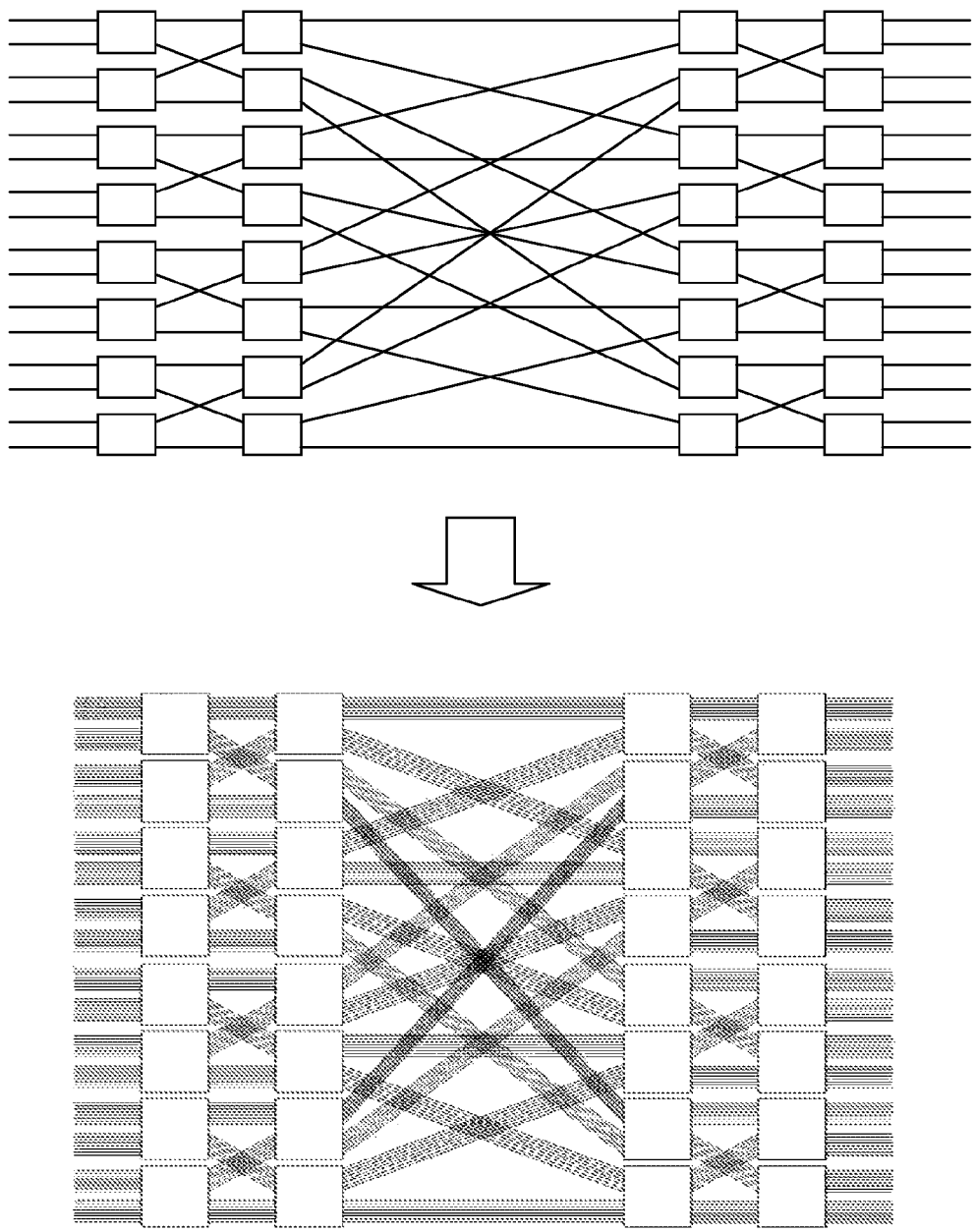

As illustrated in FIG. 2b, line groups and 16-to-8 concentrators can be used in 16×16 network showed in FIG. 2a to obtain a 128×128 network with G=8.

Logically, a 2G-to-G concentrator is equal to 2×2 basic routing cell, as the address of its G ports in each input (output) group is identical. A 2G-to-G concentrator is a 2G×2G sorting switching module which can separates the larger G signals and transmits them to the corresponding output ports.

Figure 3:
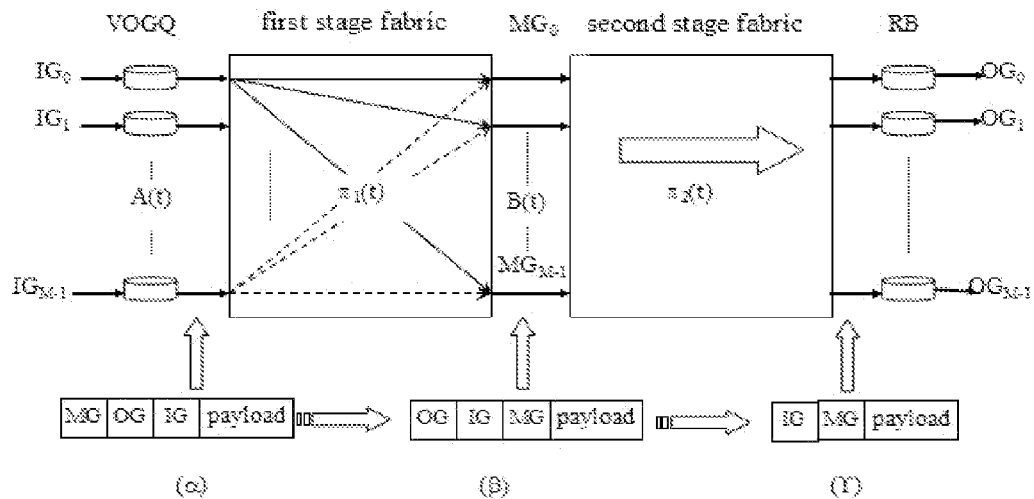
FIG. 3 illustrates a schematic of the load-balancing packet switching structure model of this invention.

As illustrated in FIG. 3, two multi-path self-routing switching fabrics are concatenated to compose the main body, and the whole inventing load-balancing packet switching structure is composed by appended VOGQs ahead of the first stage fabric and configured RBs behind the second stage fabric.

Actually, the first stage fabric serves as a load-balancer, which is responsible for uniformly distributing any pattern of incoming traffic to all the output group ports of the first stage fabric. Consequently, the second stage fabric just forwards the reassembled data coming from the first stage fabric to their final destinations in a self-routing scheme. Every G inputs(outputs) are bundled into an input (output) group, thus M groups are formed on the input(output) side (N=M×G). To ease presentation, let $IG_i(OG_i)$ denotes a specific input(output) group, and $MG_i$ represents a line group between the two stages (i,j=0 to M−1).

VOGQs are logically the same as VOQ (Virtual Output Queuing); however, each VOGQ is responsible for storing packets from G input ports. Let VOGQ(i,j) denotes the VOGQ storing the packets destined from $IG_i$ to $OG_j$; and call the current queue length of a particular VOGQ(i,j) as $L_{ij}$, which is the amount of packets waiting for transmission in buffer.

Generally, for our proposed scheme, the processing of arriving packets in each time slot is composed by several sequential phases, which should be executed in pipeline for keeping the transferring as fast as possible:
1) Arrival phase: New packets arrive at the IGs during this phase. The packet destined for $OG_j$ arrives at $IG_i$ is stored into the queue of VOGQ(i,j).
2) Packaging phase: packets stored in VOGQs are united into data blocks. Then these blocks are segmented and labeled into data slices according to Algorithm 1 and prepared to be transmitted (see data slice format α in FIG. 3).
3) Balancing phase: Aided by MG tags, IGs simultaneously send the packaged data slices to the middle groups. When the slices reach the middle groups, MG addresses will be reinserted as MG tag between IG tag and payloads (see format β in FIG. 3).
4) Forwarding phase: data slices are further forwarded by the second stage fabric, a self-routing forwarder to their final destinations with the aid of OG address tags. When these slices reach the OGs, the OG tags are discarded (see format γ in FIG. 3).
5) Departure phase: data slices segmented by Algorithm 1 are recombined according to Algorithm 2 in RB and delivered from the OGs of the fabric to next hop.

Here is a detailed description of Algorithm 1 and Algorithm 2.

Algorithm 1:

For each IG, during the packaging phase, data stored in VOGQ(i, j) are evenly cut into M data slices that is marked as payload in FIG. 3. Then, 3 tags including MG, IG and OG are appended ahead of each slice for self-routing purpose through the two stage fabric.

Figure 4:
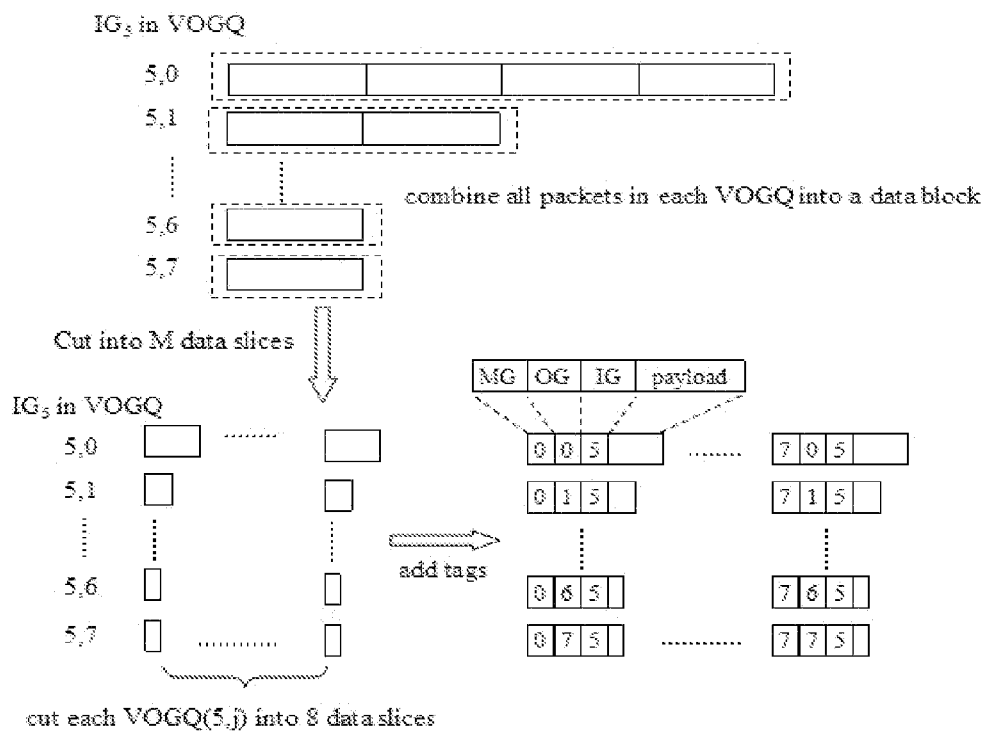
FIG. 4 is the diagram of Algorithm 1 in the implementation example of this invention.

For easily understand, here gives the pseudo-code of Algorithm 1 in software language C. FIG. 4 gives a detailed example when M=8, and VOGQs at IG5 satisfies: $L_{5,0}=5$, $L_{5,1}=2$, $L_{5,6}=L_{5,7}=1$.

```
/*pseudo-code of Algorithm 1, M is total number of groups*/
DataBlock[M][M];          /*DataBlock(i,j) denotes the data blocks storing in VOGQ(i,j)*/
SlicePayload[M][M][M];    /*SlicePayload(i,j,k) represents the payload of segment of DataBlock(i,j)*/
DataSlice[M][M][M];       /*DataSlice(i,j,k) represents data slices with tags*/
    IG[M]={0, 1, 2, 3, ..., M-1};
    OG[M]={ 0, 1,2, 3,,...,M-1};
    MG[M]= { 0, 1, 2, 3,,...,M-1};
/*IG, OG and MG array are stored with self-routing tags*/
    for (i=0;i<M;i++)      /*process each input group, running parallel in practical engineering*/
        for (j=0; j<M;j++){
            Segment(DataBlock[i][j]);   /*cut data blocks evenly into M payload, generate
                SlicePayload without tags */
            for (k=0;k<M;k++)
            {
            AddTag(SlicePayload[i][j][k],IG[i],OG[j],MG[k]);
                /*add tags to segmented payload orderly, generate data slices DataSlice(i,j,k)*/
            }
        }
```

As is illustrated in FIG. 4, for $IG_5$, during the packaging phase, data stored in VOGQ(5, j) are evenly cut into M=8 data slices. Then, tags MG, IG and OG are appended ahead of each slice. For the VOGQ(5, j), IG in all the 8 data slices is equal to 5, and OG is equal to j, while MG is assigned numbers in order from 0 to 7 which is used to make the traffic from external input to some external (second stage) output uniformly distribute to all first stage output groups.

Algorithm 2:

Data slices with the same IG tag are reunited together. MG tag carried by the slices will keep the data in the original sequence. Afterwards, the restored packets could depart from the OGs.

Figure 5:
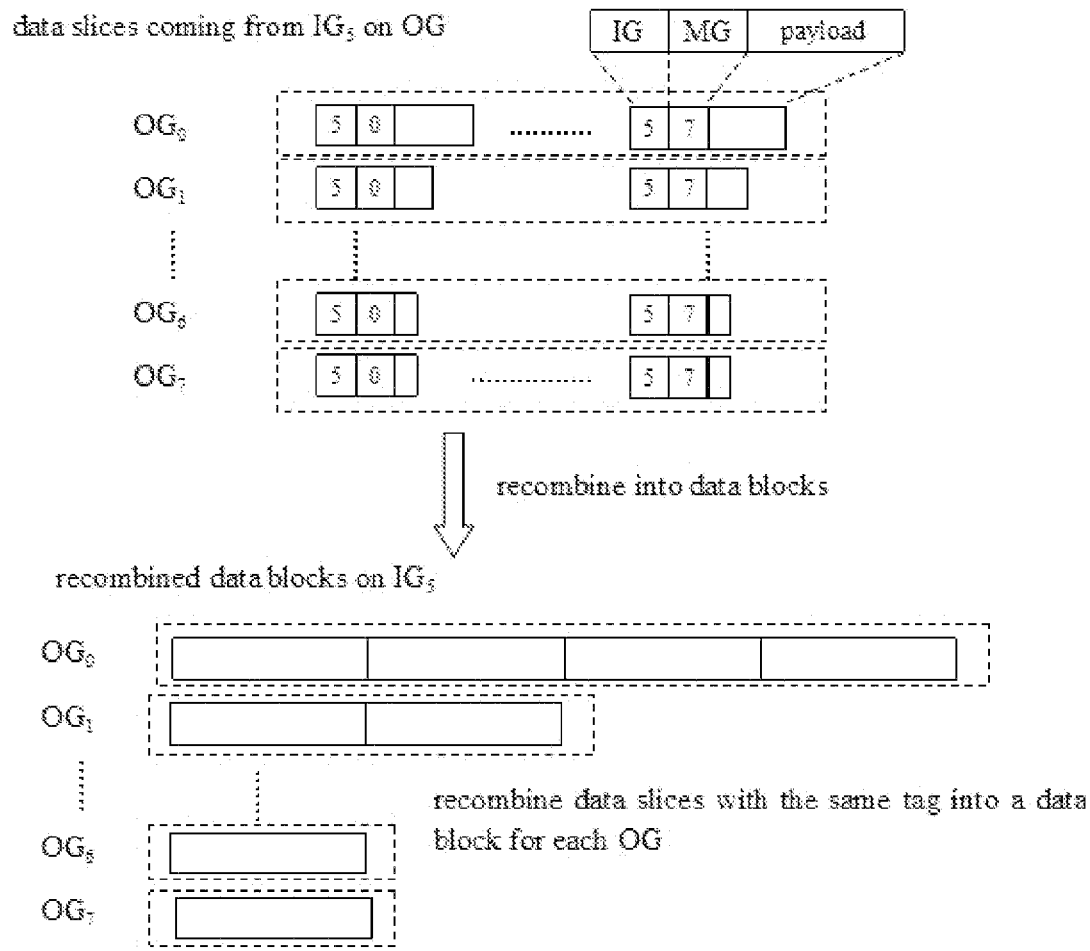
FIG. 5 is the diagram of Algorithm 2 in the implementation example of this invention.

As is illustrated in FIG. 5, pseudo-code of Algorithm 2 in software language C is given below.

```
/*pseudo-code of Algorithm 2, M is total number of groups*/
DataBlock[M][M];          /*DataBlock(i,j) denotes the data blocks storing in VOGQ(i,j)*/
SlicePayload[M][M][M];    /*SlicePayload(i,j,k) represents the load of segment of DataBlock(i,j)*/
DataSlice[M][M][M];       /*DataSlice(i,j,k) represents data slices with tags*/
     IG[M]= {0, 1, 2, 3, ..., M-1};
     OG[M]= {0, 1, 2, 3, ..., M-1};
     MG[M]= {0, 1, 2, 3, ..., M-1};
     /* IG, OG and MG array are store self-routing tags*/
for (j=0;j<M;j++)       /*process each output group, running parallel in practical engineering */
     for (i=0; i<M;i++){
          for (k=0; k<M;k++)
            { DeleteTag(DataSlice(i,j,k), IG[j], MG[k]);
            /*delete IG, MG tags from DataSlice, recover original SlicePayload without tags, OG tags
            has been discarded, see format β in FIG. 3*/
              Recover(DataBlock(i,j), SlicePayload(i,j,k));
            /*combine SlicePayload(i,j,k) in the order of k, recover DataBlock(i,j)*/
            }
     }
     /*completely recovering data blocks, re-segment by size and then leave the OGs*/
```

As is illustrated in FIG. 5, data slices from $IG_5$ on each OG are collected according to Algorithm 2. They are combined in the order of MG tags, tags are deleted after the data blocks are recovered. After segmenting according the size of packet, they will depart from the OGs.

VOGQ that is appended ahead of each input group port of the first stage fabric segments and packages each packet leaving for all output ports. Data slices are re-sequenced in RB behind the output group port. As the number of fabric output group ports is M, packets should be evenly cut into M data slices. However, the size of a 2G-to-G self-routing concentrator group is G, so the relationship between M and G will influence the method of packaging and delivering. Three methods of packaging and delivering corresponding to three kinds of relationship are given below.

1) M=G: this is the simplest case. Two input groups connect to a 2G-to-G self-routing concentrator whose scale is 2G×2G. A data block in any VOGQ is cut into M data slices during packaging phase, so there are M data slices in each input port in a 2G-to-G self-routing concentrator. For M=G, M data slices in any VOQ of each VOGQ can be transmitted to input ports in one time slot. There are no buffers in fabric, hence, the transmission delay of M data slices are identical, that is, they arrive at RB behind the output ports at the same time slot. After recombined into original data blocks, they are transmitted to line cards on output ports. G packets are restored in corresponding queue in VOGQ according to output address. Actually, a VOGQ ahead of an IG has M VOQs because of M output ports. Every VOQ Packets from each VOGQ has one chance of delivering during every M consecutive time slots.

2) M<G: $M=2^m$, $G=2^g$, so G is $2^x$ times as larger as M. As VOQs data blocks from each VOGQ are cut into M data slices, a 2G-to-G self-routing concentrator whose scale is 2G×2G, is not fully use under the situation of transmitting one VOQ from some VOGQ each time, that is, the number of used input(output) ports is 2M (there are 2G input (output) ports in each self-routing concentrator). In order to fully utilize the switching capacity, $2^x$ VOQs are cut and packaged from some VOGQ. As a result, there are $2×2^x×M=2G$ data slices in one self-routing concentrator. Every VOQ Packets from each VOGQ has one chance of delivering during every $G/2^x=M$ consecutive time slots.

3) M>G: $M=2^m$, $G=2^g$, so M is $2^x$ times as larger as G. As data blocks are cut into M data slices for each VOQs in VOGQ, a 2G-to-G self-routing concentrator whose scale is 2G×2G, were unable to handle all the slices from each VOQ of any VOGQ (2M data slices are generated at two input ports). To solve the problem, M data slices are divided into $2^x$ parts and every part has G data slices. Meanwhile, in order to avoid internal blocking in load-balancing fabric, IGs also divided into $2^x$ parts and each part has G IGs. During each of $2^x$ consecutive time slots, G IGs deliver data to 0 to (G−1), G to (2G−1), . . . , and (M−1−G) to (M−1) in turns respectively. A VOQ completes data transmission in $2^x$ time slots. Packets from each VOGQ are delivered completely during $2^x×M$ time slots.

Since the packet switching structure based on self-routing concentrators can be constructed recursively, its scale is unlimited. Meanwhile, the property of its distributed and self-routing mechanism provides the possibility to achieve a large-scale on technology and physics.

To sum up, this invention provides a load-balancing packet switching structure including the first stage fabric based on self-routing concentrators that is used to balance the load and the second stage fabric that self-routes and forwards the reassembled data to their final destinations. The character of the structure is: a VOGQ is appended at each input group port of the first stage fabric, and a RB is configured behind each output group port of the second stage fabric. Wherein each of said VOGQ is used to store data blocks that carries self-routing address information, wherein each of said RB is used to reordering the data blocks according to their input group self-routing address for subsequent treatment. Moreover, the first stage fabric is connected to the second stage fabric by a set of middle line group.

The structure, which is based on self-routing concentrators, is divided into a first stage and a second stage fabric. A VOGQ is appended to each input group port of the first stage fabric, and a RB is configured behind each output group port of the second stage fabric. Packets stored in the VOGQ are combined into a data block in preset length, and data blocks are divided into data slices of fixed size, then each data slice is added an address tag and are delivered to the first stage fabric for self-routing. Once reaching the RB, data slices are recombined into data blocks according the address tags appended on its head. Comparing this structure with the LB-BvN, it is clear that this invention of load-balancing packet switching structure avoids the VOQ between the first stage and the second stage fabrics, this remove the problem of queuing delay between the first stage and the second stage fabrics and packet out-of-sequence. Therefore, this invention solves the packet out-of-sequence problem in load-balancing Birkhoff-von Neumann switching structure and improves the end-to-end throughput.

The above mentioned is just a better example of the invention, it is not used to restrict the invention. According to the invention, any revise, identical substitute, improve and so on should be protected.

What is claimed is:

1. A method for constructing load-balancing packet switches, the method comprising:
    constructing a distributed self-routing concentrator structure wherein a first stage switching fabric uniformly distributes any pattern of incoming traffic to load-balance all output group ports of the first stage switching fabric, while a second stage switching fabric just self-routes and forwards data coming from the first stage switching fabric to final destinations;
    appending a virtual output group queue (VOGQ) at each input group port of the first stage switching fabric, and a reordering buffer (RB) configured behind each output group port of the second stage switching fabric, wherein each said VOGQ stores data slices which carry self-routing address information, and each said RB reorders the data slices according to a corresponding input group self-routing address for subsequent treatment;
    storing packets in the VOGQ as data slices of fixed size, and wherein a line group (MG) tag, an output group (OG) tag, and an input group (IG) tag are appended, in order, before each data slice and delivering the packets to the first stage switching fabric for routing;
    passing the packets configured with the OG tag, the IG tag, and the MG tag appended, in order, before the data slice from the first stage switching fabric to the second stage switching fabric; and
    recombining the data slices according to the IG and MG tags carried by the packets once the packets have reached the corresponding RB through the second stage switching fabric.

2. The method as recited in claim 1, wherein an output of the first stage switching fabric is connected to an input of the second stage switching fabric by a set of middle line groups.

3. The method as recited in claim 1, wherein the structure adopts a distributed self-routing mechanism.

4. The method as recited in claim 2, wherein the structure adopts a distributed self-routing mechanism.

5. The method for constructing load-balancing packet switches of claim 1, wherein the OG tags are discarded when the packets reach a respective output group.

6. A load-balancing packet switching structure, which is based on self-routing concentrators includes a first stage switching fabric that uniformly distributes any pattern of incoming traffic to load-balance all output group ports of the first stage switching fabric, and a second stage switching fabric that just self-routes and forwards reassembled data coming from the first stage switching fabric to final destinations, wherein a virtual output group queue (VOGQ) is appended at each of a plurality of input group ports of the first stage switching fabric, and wherein a reordering buffer (RB) is configured behind each output group port of the second stage switching fabric, wherein each said VOGQ stores packets comprising data slices with a line group (MG) tag, an output group (OG) tag, and an input group (IG) tag appended, in order, before each data slice and wherein the first stage switching fabric passes the packets configured with the OG tag, the IG tag, and the MG tag appended, in order, before the data slice to the second stage switching fabric and wherein each said RB reorders the data slices according to the IG and MG tags for subsequent treatment, and wherein the first stage switching fabric is connected to the second stage switching fabric by a set of middle line groups.

7. The load-balancing packet switching structure of claim 6, wherein the OG tags are discarded when the packets reach a respective output group.

* * * * *